(12) United States Patent
Monti (10) Patent No.: US 12,321,508 B2
(45) Date of Patent: Jun. 3, 2025

(54) DISPLAY SYSTEM AND METHOD (71) Applicant: Sony Interactive Entertainment Inc., Tokyo (JP)

(72) Inventor: Maria Chiara Monti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/867,776

(22) Filed: Jul. 19, 2022

(65) Prior Publication Data

US 2023/0027060 A1 Jan. 26, 2023

(30) Foreign Application Priority Data

Jul. 21, 2021 (GB) ...................................... 2110461

(51) Int. Cl.
*G06F 3/01* (2006.01)
*G06F 3/16* (2006.01)
*H04R 1/02* (2006.01)
*H04R 1/40* (2006.01)
*H04R 3/00* (2006.01)

(52) U.S. Cl.
CPC ................ *G06F 3/011* (2013.01); *G06F 3/16* (2013.01); *H04R 1/028* (2013.01); *H04R 1/406* (2013.01); *H04R 3/005* (2013.01); *H04R 2499/15* (2013.01)

(58) Field of Classification Search
CPC ........ G06F 3/011; G06F 3/16; G06F 3/04815; H04R 1/342; H04R 1/406; H04R 3/005; H04R 2499/15; H04N 21/21805; H04N 21/4394; H04N 21/234345; H04N 19/597
See application file for complete search history.

(56) References Cited

U.S. PATENT DOCUMENTS

| | | | |
|---|---|---|---|
| 2016/0012855 A1 | 1/2016 | Krishnan | |
| 2017/0289219 A1* | 10/2017 | Khalid | ................. H04N 21/816 |
| 2019/0005986 A1 | 1/2019 | Peters | |
| 2019/0158899 A1* | 5/2019 | Sakai | ................... H04N 21/437 |
| 2019/0373391 A1 | 12/2019 | Han | |
| 2019/0392642 A1* | 12/2019 | Uberti | ................... G06T 15/506 |

FOREIGN PATENT DOCUMENTS

| | | |
|---|---|---|
| EP | 3588448 A1 | 1/2020 |
| WO | 2018136301 A1 | 7/2018 |

OTHER PUBLICATIONS

Combined Search and Examination Report for corresponding GB Application No. GB2110461.7, 7 pages, dated Dec. 3, 2021.
Extended European Search Report for corresponding EP Application No. EP22184355.0, 8 pages, dated Dec. 13, 2022.
Examination Report for corresponding GB Application No. 2110461. 7, 4 pages, dated Dec. 15, 2023.

(Continued)

*Primary Examiner* — Priyank J Shah
(74) *Attorney, Agent, or Firm* — Fish & Richardson P.C.

(57) ABSTRACT

A system for obtaining content for display to a user of a head-mountable display device, HMD, the system comprising one or more audio detection units operable to capture audio in the environment of the user, a motion prediction unit operable to predict motion of the HMD in dependence upon the captured audio, and a content obtaining unit operable to obtain content for display in dependence upon the predicted motion of the HMD.

13 Claims, 4 Drawing Sheets

(56) References Cited

OTHER PUBLICATIONS

Examination Report for corresponding GB Application No. 2110461.7, 4 pages, dated Apr. 22, 2024.
Examination Report for corresponding GB Application No. 2110461.7, 4 pages, dated Sep. 27, 2024.
Office Action (Communication pursuant to Article 94(3) EPC) issued in related EP Application No. 22184355.0 on Oct. 28, 2024; 8 pages.
Anonymous: "Cache (computing)—Wikipedia", Jul. 14, 2021 (Jul. 14, 2021), pp. 1-11, XP093217281, Retrieved from the Internet: URL:https://en.wikipedia.org/w/index.php?title=Cache_(computing)&oldid=1033509761.

* cited by examiner

DISPLAY SYSTEM AND METHOD

BACKGROUND OF THE INVENTION

Field of the Invention

This disclosure relates to a display system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years the use of head-mountable displays (HMDs) has become increasingly common; this is driven in part by the increasing availability of high-quality hardware, and in part by the increasing processing power available to consumers enabling the generation of high-quality image content for display by HMDs. The use of HMDs is considered to be advantageous in that it enables an immersive interactive experience to be provided to a user—this may be through a virtual reality (VR) application in which the user is presented with images of an entirely virtual environment, or an augmented reality (AR) application in which a user is presented with imagery overlaid upon a view of the real environment. Such experiences may include the viewing of video content or the playing of video games, for example.

In order to preserve the user's sense of immersion in the content, it is considered important that high-quality image content is provided. For instance, this can mean that content having a high resolution is considered preferable as low-resolution content may be easily distinguishable from real-world content. Similarly, other aspects of the content such as lighting effects and image latency may also be considered to be important for providing a user with an immersive experience. Many aspects of the content may be related such that an improvement to one (resolution or texture quality) can lead to problems with another (such as latency in rendering the image or a particular texture).

Many techniques have been proposed to assist with the generation of high-quality image content for display using an HMD; for instance, foveal rendering has been an area of interest in recent years. However, many of these techniques can be rather limited in their impact, or can require significant extra equipment (such as gaze tracking cameras) to implement. It is therefore considered that further improvements to a content providing process for HMDs would be desirable.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views, embodiments of the present disclosure are described.

Figure 1:
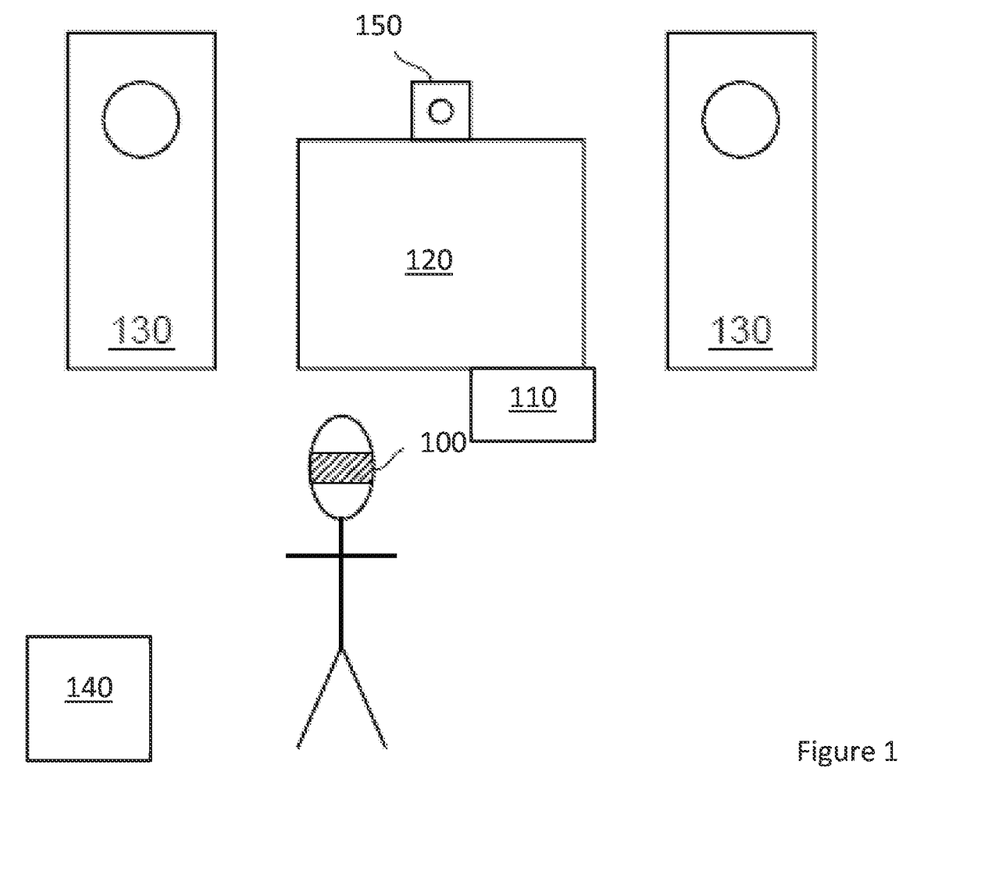
FIG. 1 schematically illustrates a display system comprising an HMD.

FIG. 1 schematically illustrates a display arrangement that includes an HMD 100. This HMD 100 may be a full-immersion style HMD in which the user's view of the real environment is obscured by a display, or a see-through style HMD in which the user is able to view the real environment through the display. The display arrangement also comprises a processing device 110 (such as a games console or a computer), an optional display device 120 associated with the processing device 110, optional loudspeakers 130, and a sound source 140. An optional camera 150 is shown, which may be used for capturing images of the environment; these images may be used to identify the location of one or more of the user, HMD 100, and a sound source 140.

The HMD 100 may be provided with content for display by the processing device 110 via a wired or wireless connection; alternatively, or in addition, content for display may be generated by the HMD 100 or by a server (or other remote processing device) that is able to be accessed by a network connection or the internet. In some embodiments, the display 120 may be used to provide supplementary content for the HMD 100 and/or spectator views for people not using HMDs.

The speakers 130 may be used to provide audio to the user of the HMD 100 during the display of content; however in many cases the speakers 140 may not be required—for instance, if the HMD 100 comprises earphones or headphones.

The sound source 140 is shown in FIG. 1 so as to represent any object that may be present in the environment that may generate a sound that can be audible to the user of the HMD 100. Examples include electronic devices, such as speakers associated with devices other than the processing device 110—examples of such devices include doorbells, mobile phones, radios, portable games consoles, games controllers, and other HMDs. Similarly, electronic devices may generate sounds in other ways—such as through haptic feedback or the like. Other sound sources may include non-electronic devices, such as pets, other people, and events such as windows or doors closing loudly.

While discussed here as being a particular object or person, a sound source may in some cases not correspond to an element directly. This is because of audio effects such as echoes which can distort the apparent source of a sound—in such cases, the sound source 140 may therefore be an apparent sound source rather than an actual one. It is considered that this would not significantly alter the operation of arrangements according to embodiments of the present disclosure as it is the perceived (by the user of the HMD) location of a sound source that is of interest. In such a case the user may be expected to turn towards the reflected sounds independently of whether this direction represents the actual location of the sound source.

One or more of the devices may include microphones or microphone arrays that are able to detect sounds within the environment; in particular, the HMD 100 may comprise one or more microphones or microphone arrays. These microphones may be provided in any suitable arrangement so as to enable the localisation of sounds within the environment. For example, several devices may each capture audio in the environment and a comparison of the magnitudes of a corresponding sound recorded at each microphone may be compared to determine a position. Similarly, arrays of microphones at one or more devices or directional microphones may be used to perform this localisation. In some embodiments, the microphones are not associated with another device, but are instead provided as individual units that are able to perform processing or to communicate with a device (such as via a wired or wireless connection) to determine at least a localisation of the sound.

Figure 2:
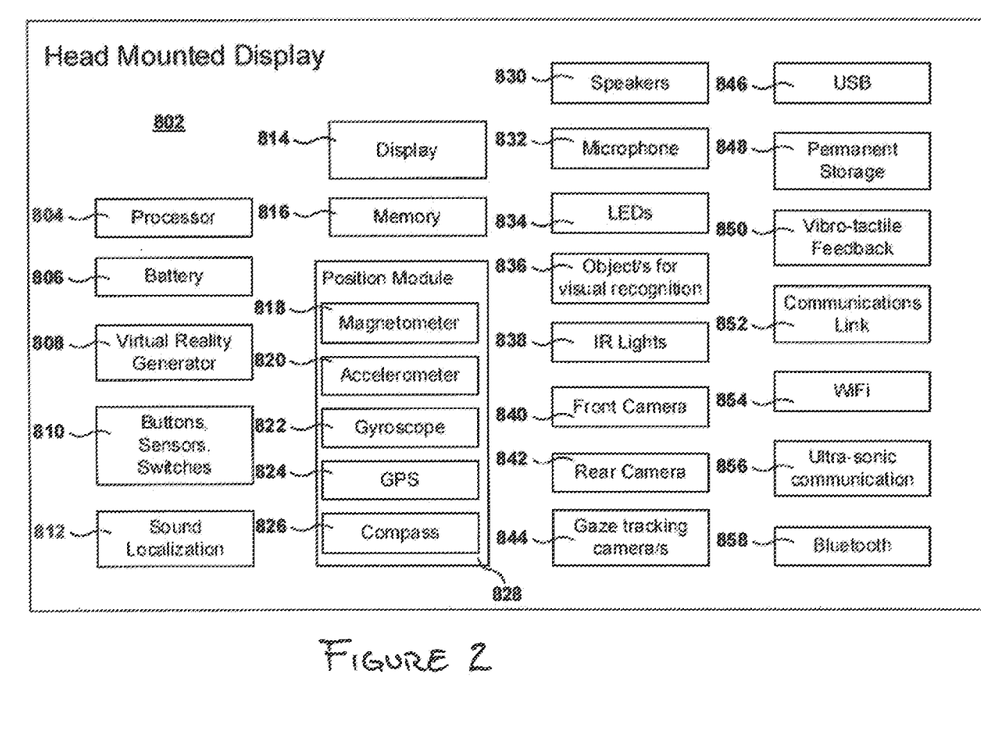
FIG. 2 schematically illustrates an HMD.

FIG. 2 illustrates the architecture of a head-mounted display ('HMD') device; the HMD may correspond to the HMD 100 of FIG. 1. The HMD is typically a computing device and may include modules usually found on a computing device, such as one or more of a processor 804, memory 816 (RAM, ROM, etc.), one or more batteries 806 or other power sources, and permanent storage 848 (such as a solid state disk).

One or more communication modules can allow the HMD to exchange information with other portable devices, other computers (e.g. a PSS®), other HMDs, servers, etc. Communication modules can include a Universal Serial Bus (USB) connector 846, a communications link 852 (such as Ethernet®), ultrasonic or infrared communication 856, Bluetooth® 858, and Wi-Fi® 854.

A user interface can include one or more modules for input and output. The input modules can include input buttons (e.g. a power button), sensors and switches 810, a microphone 832, a touch sensitive screen (not shown, that may be used to configure or initialize the HMD), one or more front cameras 840, one or more rear cameras 842, one or more gaze tracking cameras 844. Other input/output devices, such as a keyboard or a mouse, can also be connected to the portable device via communications link, such as USB or Bluetooth®.

The output modules can include the display 814 for rendering images in front of the user's eyes. Some embodiments may include one display, two displays (one for each eye), micro projectors, or other display technologies. The user typically sees the or each display through left and right optical assemblies 815 L,R. Other output modules can include Light-Emitting Diodes (LED) 834 (which may also be used for visual tracking of the HMD), vibro-tactile feedback 850, speakers 830, and a sound localization module 812, which performs sound localization for sounds to be delivered to speakers or headphones. Other output devices, such as headphones, can also connect to the HMD via the communication modules, be permanently attached to the HMD, or integral to it.

One or more elements that may be included to facilitate motion tracking include LEDs 834, one or more objects for visual recognition 836, and infrared lights 838. Alternatively or in addition, the one or more front or rear cameras may facilitate motion tracking based on image motion.

Information from one or more different modules can be used by the position module 828 to calculate the position of the HMD. These modules can include a magnetometer 818, an accelerometer 820, a gyroscope 822, a Global Positioning System (GPS) module 824, and a compass 826. Alternatively or in addition, the position module can analyse image data captured with one or more of the cameras to calculate the position. Further yet, optionally the position module can perform tests to determine the position of the portable device or the position of other devices in the vicinity, such as a Wi-Fi® ping test or ultrasound tests.

A virtual reality generator 808 then outputs one or more images corresponding to a virtual or augmented reality environment or elements thereof, using the position calculated by the position module. The virtual reality generator 808 may cooperate with other computing devices (e.g., PSS® or other game console, Internet server, etc.) to generate images for the display module 814. The remote devices may send screen updates or instructions for creating game objects on the screen.

Hence the virtual reality generator 808 may be responsible for none, some, or all of the generation of one or more images then presented to the user, and/or may be responsible for any shifting of some or all of one or both images in response to inter-frame motion of the user (e.g. so-called reprojection).

It should be appreciated that the embodiment illustrated in FIG. 2 is an exemplary implementation of an HMD, and other embodiments may utilize different modules, a subset of the modules, or assign related tasks to different modules. The embodiment illustrated in FIG. 2 should therefore not be interpreted to be exclusive or limiting, but rather exemplary or illustrative.

Figure 3:
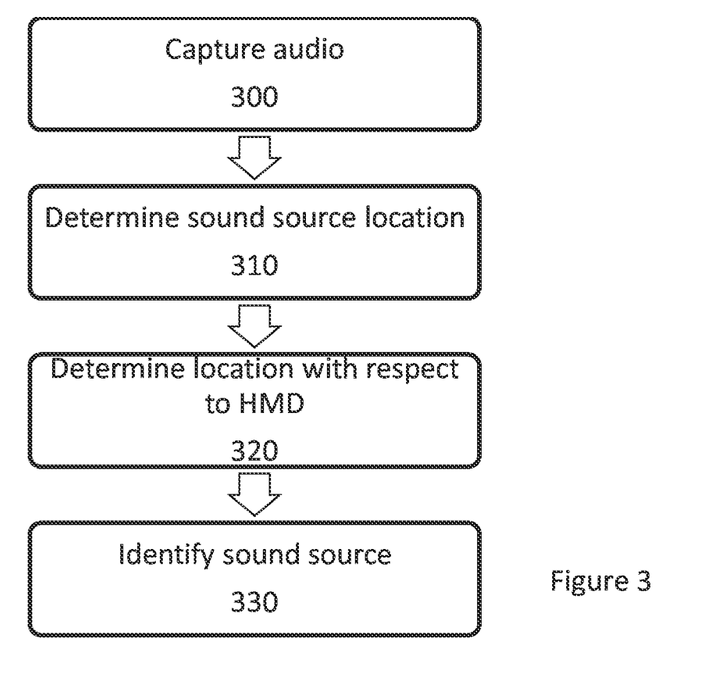
FIG. 3 schematically illustrates a method for localising, and optionally identifying, sounds within the environment of a user of an HMD.

FIG. 3 schematically illustrates a method for localising, and optionally identifying, sounds within the environment of a user of an HMD. While shown in a particular order, the steps may be performed in a different order as appropriate. For example, an identification of a sound source may be performed before the localisation where desired—these processes may also be performed simultaneously (or in an overlapping fashion) in some embodiments.

A step 300 comprises capturing audio comprising one or more sounds within the environment of the user of the HMD. As discussed above, this audio may be captured by one or more microphones (directional or non-directional) and/or microphone arrays that are present within the environment of the user. These microphones may be standalone microphones, associated with a particular device (such as the HMD or processing device in FIG. 1), or integrated with a device as appropriate for each microphone and microphone array.

A step 310 comprises determining a location of a respective sound source associated with sounds within the captured audio. This location is determined with respect to a microphone associated with a particular captured audio clip; in some embodiments this may comprise the identification of a distance of the sound source from each of a plurality of microphones (for instance, based upon relative intensity) with these distances being used to determine the location via a triangulation method. Alternatively, in the case of a microphone array or directional microphone, the location of the sound source relative to the microphone array/directional microphone may be determined directly. In some cases, this step may further comprise the determination of the location of the location of a device or the like from which a sound originates if this is different to the location of the sound itself—for instance, identifying the location of a mobile phone if a notification sound is played through a speaker remote to the mobile phone.

A step 320 comprises determining a location of a respective sound source with respect to the HMD; this may comprise processing to generate a relative position based upon known locations of the HMD and a microphone (for example), or processing to generate a map or the like of the locations of the HMD and at least one sound source in the environment. For instance, a transformation between coordinate systems having a respective origin at a microphone used to determine a sound source location and an HMD may be provided to convert the location to the correct reference frame. Alternatively, or in addition, a map of objects within the real environment may be maintained (for example, by the HMD or a processing device) which is updated with location information and used to determine relative positions.

A step 330 comprises an optional identification of the sound source; this can be performed in a number of ways. In some examples, this identification may be performed based upon an optical recognition (for instance, using images captured by a camera associated with an HMD or another device in the environment). This identification may utilise the localisation information for the sound source to determine the location of the sound source within the image, for instance based upon knowledge about the correspondence of the field of view of the camera with the environment. Alternatively, or in addition, the identification process may include an audio recognition process in which the captured sounds are processed to identify the sounds and identify a sound source based upon the sounds.

In some embodiments the step 330 may be performed prior to the localisation of the sound source, and can be used to assist with this process. For instance, using predetermined information about the environment and the objects (including potential sound sources) within the environment an audio recognition process can be used to identify the identity of a sound source—this can then be linked to a particular object or element within the environment which has a known location. The locations of these elements may be determined in advance using any suitable method—for instance, SLAM models or other optical-based mapping techniques may be used, or a user may be requested to populate a map manually. In some embodiments, it may be considered appropriate to perform an audio calibration process to enable a localisation of sound sources in advance—this can include performing the localisation process in response to a known sound so as to link a source and an emitted sound more directly. For instance, a user may press a doorbell at a predetermined time in the calibration process so as to enable an easy detection and localisation of a known sound source.

It is therefore considered that embodiments of the present disclosure may utilise a method in accordance with FIG. 3 so as to determine a location, and optionally an identity, of a sound source within the environment of a user of an HMD. These determined characteristics of a sound source may be used to generate a prediction of user head motion in response to the sound.

Figure 4:
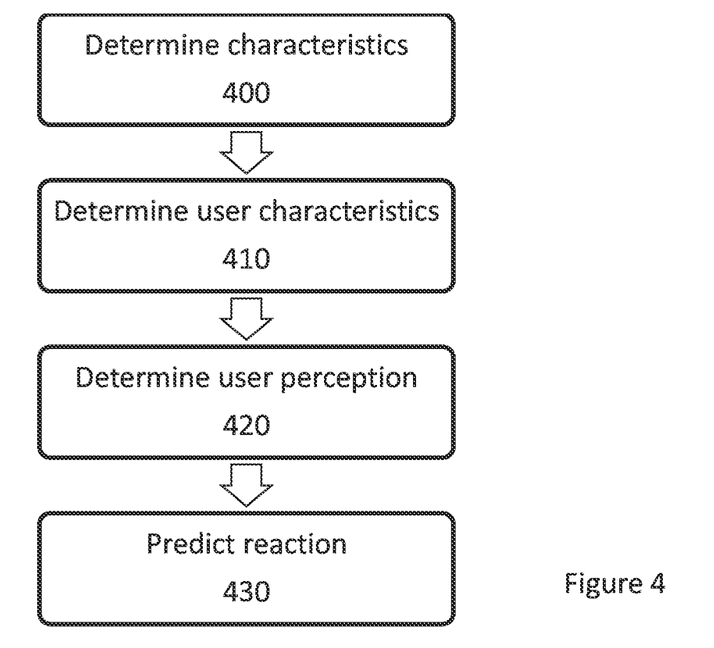
FIG. 4 schematically illustrates a method of generating a prediction of user head motion.

FIG. 4 schematically illustrates a method of generating such a prediction of user head motion. While dependent upon the location and/or identification of the source of a sound that is heard by a user, other factors may also be considered as a part of this prediction process. While four individual steps are shown below, it is considered that each of steps 400, 410, and 420 are optional—in a number of embodiments it is considered that only one or two of these steps may need to be performed to enable the determination of step 430 to be performed.

A step 400 comprises determining one or more characteristics of the detected sound and/or the sound source associated with the detected sound. These characteristics can include one or more properties of the audio itself—examples include a volume (peak or average volumes may be considered), frequency profile, meaning (such as if the sound is a notification sound or alarm sound), frequency range (and/or a minimum and maximum value), and frequency of occurrence. Alternatively, or in addition, the characteristics may relate to the source of the sound (such as a particular object or person). Examples of these characteristics include an identity of the sound source (this may be specific, such as 'person X', or more general, such as 'a person', for example), a proximity of the sound source, a relative height of the sound source to the user's head, information about movement of the sound source (measured or predicted, for instance based upon the captured audio and/or images captured of the sound source), and a significance of the sound source. The significance here refers to a measure of how significant the audio is—for instance, alarms may have a high audio significance (as they function as a warning) while a ticking clock may have a low significance (as this is a sound that would have little impact upon the user, as it would be regarded as background noise only).

A step 410 comprises a determination of characteristics of the user of the HMD. These characteristics can include any characteristics that can modify a user's perception of audio within the environment. Some characteristics may relate to the user's location, head orientation, and their pose (such as sitting or standing); alternatively, or in addition, characteristics such as a personal head-related transfer function (HRTF) or hearing capabilities may be considered so as to indicate how (or indeed if) the user would perceive a particular sound.

In addition to these characteristics, it is also considered that a user's usage history of the HMD (such as reactions to previous sounds) may be identified as a part of this step. This usage history may also comprise the results of a calibration process or the like that is used to identify user reactions to sounds. User preferences may also be considered; for instance, a user may be able to indicate which sounds are likely to capture their attention.

A step 420 comprises determining an expected user perception of the sound, in dependence upon one or both of the determinations performed in steps 400 and 410. This step effectively determines how much of an impact the sound will have upon the user—this can be a measure of both the audio impact (such as how loud the sound will be) and/or the psychological impact (such as how interested the user would be in the sound).

A step 430 comprises determining an expected or predicted user reaction to the sound, in dependence upon one or more of the determinations of steps 400, 410, and 420. This determination is concerned with a physical reaction of the user of the HMD, as this will be expected to involve a movement of the user's head—and this movement results in a change in the orientation of the HMD worn by the user. It is therefore considered that this determination may equally be considered to be a determination of a predicted motion of the user's head or the HMD.

In some cases, a predicted user reaction may be that of turning their head in the direction of the detected sound. Such a prediction can be made in dependence upon any combination of one or more of the above determinations (that is, the determinations in steps 400, 410, and 420); for instance, the sound may be characterised as being 'attractive' (in that it attracts user attention), and/or the user may be characterised as being attracted by the sound (for instance, based upon a user profile or usage history), and/or a particular perception may be anticipated that would lead to a user turning their head (such as a particularly loud or intrusive sound).

In some cases, a predicted user reaction may be that of turning their head away from the direction of the detected sound. Such a prediction can be made in dependence upon any combination of one or more of the above determinations (that is, the determinations in steps 400, 410, and 420); for instance, the sound may be determined as 'repulsive' (in that a user is likely to turn away from the sound, such as if the sound is indicative of an imminent collision), and/or the user may be characterised as disliking the sound, and/or the determined perception by the user is that of the sound being particularly unpleasant (leading to them turning away).

Of course, in some cases it may be determined that the user is simply unlikely to respond to the detected sound.

Rather than determining a direction of the predicted motion (such as towards/away from a sound source), it is also considered that a magnitude of the predicted motion and/or speed of the predicted motion may be determined. These factors may each be based upon one or more of the determinations performed in FIG. 4 as appropriate. For instance, the magnitude may be determined based upon the location of the sound source (such that the predicted motion is that of the user looking at the source); although this may of course be modified where appropriate for a user. For example, if a user often looks towards a sound source as a reflex action, but partway through the head motion identifies the sound and stops the motion before it is complete, then it may be considered that the predicted motion should only correspond to a partial change in viewpoint from the start to the location of the sound source.

Similarly, one or both of these factors may be determined based upon the volume of the sound as a further example. This is because a louder noise is likely to attract a greater degree of attention, resulting in a faster response by the user and potentially a more complete motion. Similar considerations apply for any of the characteristics determined in the method FIG. 4.

While the discussion above has largely been focused upon examples where the user looks toward a sound, it is also considered that the user may instead look towards the source of a sound or a location associated with the sound if this does not directly correspond. A first example of this is the use of a doorbell, in which the user may look towards a door rather than the speaker that produces the doorbell sound. Similarly, if a user's phone rings while connected to a speaker then the user may look towards the phone rather than the speaker.

Rather than being limited to links between sound and sound sources, in some cases a predicted motion may be determined based upon the content of the sound based upon a derived meaning of the sound. This may be particularly useful when the sound is a person speaking to the user; in such a case it may be possible to identify key words (such as 'phone') that would be likely to cause a user to move their head. This may be more appropriate, due to lower latency, than a full language processing method being performed to derive a meaning.

Figure 5:
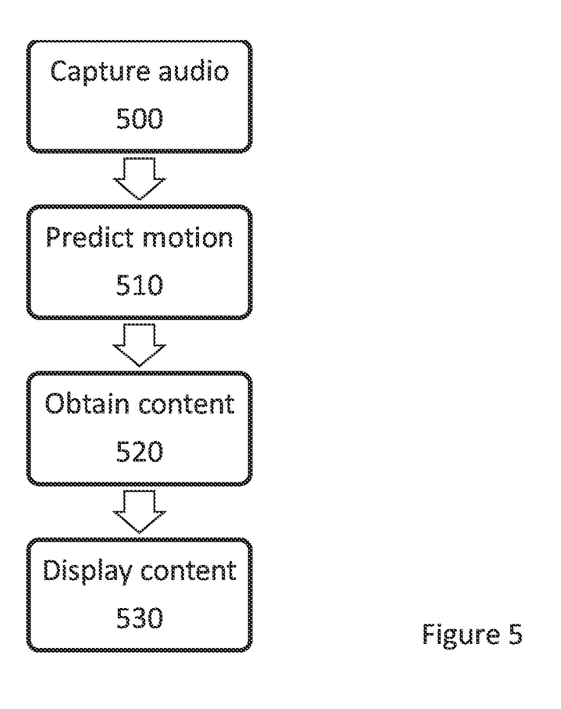
FIG. 5 schematically illustrates a method for obtaining and displaying content to a user of an HMD.

FIG. 5 schematically illustrates a method for obtaining content for display and displaying that content to a user of a head-mountable display device, HMD, in accordance with one or more embodiments of the present disclosure.

A step 500 comprises capturing audio in the environment of the user, using one or more microphones (directional or otherwise) and/or microphone arrays. This step may further comprise processing of the audio in accordance with the method of FIG. 3 so as to identify one or more characteristics of the captured audio and/or a sound source associated with the captured audio.

A step 510 comprises predicting motion of the HMD in dependence upon the captured audio. In some embodiments this dependence may be based upon a location of the audio alone, or in conjunction with a further parameter such as a volume of a sound within the captured audio. In other embodiments this prediction comprises the implementation of a method in accordance with FIG. 4; in other words, the dependence of the prediction may be upon any suitable characteristics of the sound, sound source, and/or user of the HMD.

A step 520 comprises obtaining content for display in dependence upon the predicted motion of the HMD. This content may be obtained from any of a number of sources; for instance, a processing device that stores one or more assets, or a server that distributes content for display (such as a cloud gaming server). This content may comprise pre-generated image content, for example, or any suitable elements or assets for use in generating an image for display such as meshes and/or textures.

For example, the step 520 may comprise pre-loading a texture to be used for rendering. This can reduce the latency associated with obtaining the texture at the time at which it is required, as the texture can be obtained either prior to use or at least the request to obtain the texture can be issued at an earlier time than the time at which an image frame comprising the texture is to be rendered. Pre-loading here can refer to obtaining content from a server (that is, downloading the texture in advance), loading content from a slow storage (such as a hard drive or a disc) into storage with faster access (such as a cache or solid-state drive), and/or initiating a decompression process or the like so as to reduce the time taken to access the content at the time of rendering.

In some embodiments, the content to be obtained or pre-loaded may be further determined in dependence upon one or more properties of the content itself. For instance, a larger texture may be pre-loaded in preference to a smaller texture as a larger texture is likely to be associated with a greater latency. Similarly, a priority value may be assigned to different content—for example, based upon size, access time, or image quality. A further factor that may be considered is that of the likelihood of requiring the content—for instance, content corresponding to a larger object in a scene may be considered to be more likely to be required for rendering (as a greater number of possible viewpoint positions are likely to include this object relative to a smaller object) and as such these may be prioritised. This is therefore a dependence upon the image size of an object, rather than the associated texture size.

The amount of content to be obtained may also be dependent upon the prediction. For instance, a confidence value may be assigned to a predicted motion so as to reflect the likelihood of that motion being performed by a user. These confidence values may be based upon prior motion by a user (for example, identifying that a user will turn towards a particular sound seven times in every ten), a group of users (such as identifying that seven in ten users turn towards a particular sound, while three in ten ignore it), or any other suitable measure. The higher the confidence level, the more content that may be obtained; this is advantageous in that this reduces the likelihood of obtaining a large amount of content that is not then used to generate images for display.

An optional step 530 comprises displaying the content that is obtained in step 520. This display is, of course, dependent upon the user performing the predicted motion (or at least a motion that resembles the predicted motion so as to cause an overlap in the predicted view and the actual view of the user). In other words, the content will not be displayed in the case that it is not required due to a predicted motion not being performed. In such a case, rather than the content being displayed it is considered that a user profile may be updated so as to refine the prediction process during future use.

Figure 6:
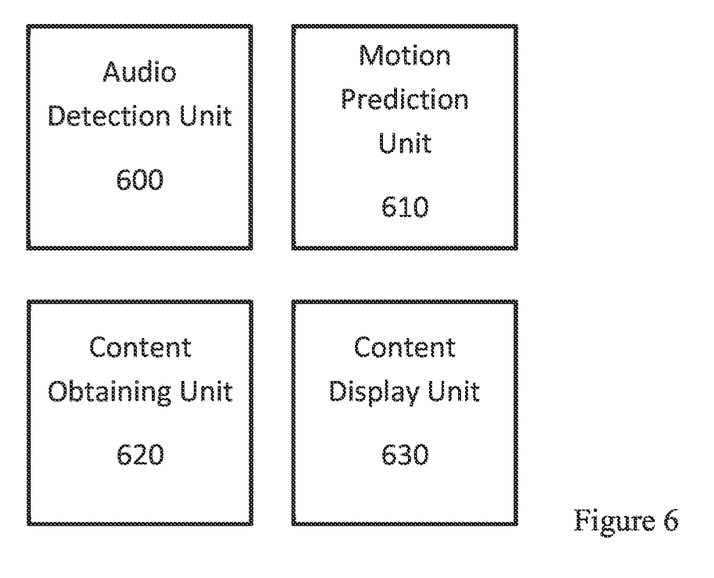
FIG. 6 schematically illustrates a system for obtaining and displaying content to a user of an HMD.

FIG. 6 schematically illustrates a system for obtaining content for display to a user of a head-mountable display device, HMD, the system comprising one or more audio detection units 600, a motion prediction unit 610, a content obtaining unit 620, and an optional content display unit 630. This system may be implemented in accordance with the arrangements in FIGS. 1 and 2 as described above.

The functionality of the motion prediction unit 610, the content obtaining unit 620, and the content display unit 630 (that is, the image generation function rather than the image display function) may be implemented using processors associated with any of the devices shown in FIG. 1 as appropriate. For instance, a processing device such as a games console may perform each of the steps; alternatively, some or all of the processing may be performed by a processor at the HMD.

The one or more audio detection units 600 are operable to capture audio in the environment of the user. The one or more audio detection units 600 may comprise one or more microphones, directional microphones, and/or microphone arrays arranged so as to capture audio in a manner that enables the source of a sound in the captured audio to be localised. The captured audio may comprise one or more sounds emitted by a device that is not associated with the HMD, such as a mobile phone or doorbell, a loudspeaker for providing audio associated with the content displayed on the HMD (and therefore the captured audio comprises sounds are associated with content displayed on the HMD in this case), or one or more non-electronic sources such as people or pets.

The motion prediction unit 610 is operable to predict motion of the HMD in dependence upon the captured audio; this prediction may also be made in dependence upon any of the factors discussed above with reference to FIG. 4.

For example, the motion prediction unit 610 may be operable to predict motion in dependence upon one or more characteristics of a sound within the captured audio and/or one or more characteristics of a sound source within the captured audio. As noted above, these characteristics can include the volume, meaning, or frequency profile of a sound and/or the identity, location, or motion of a sound source.

Alternatively, or in addition, the motion prediction unit 610 is operable to predict motion in dependence upon one or more characteristics of the user of the HMD. These characteristics are used to identify how a particular user reacts to a sound—such factors can include any of those which would distinguish between different users in the same scenario. For instance, an HRTF associated with a user may be considered, as may a sensitivity to sound (for instance, a particular user may be considered 'jumpy' if they respond to loud noises with excessive motion), and/or an interest in particular sounds. These characteristics can be input by a user, determined from a user profile, or based upon past usage of an HMD by a user (optionally, this may include a calibration process associated with the prediction process).

The motion prediction unit 610 is operable to determine a magnitude, direction, and/or speed of a predicted motion as desired. In some embodiments a prediction of the direction may be considered to be suitable for achieving the desired effect (for instance, when taken in conjunction with a known maximum or average speed of motion by a user). However, in many cases it may be considered desirable to generate a more precise prediction of the motion by including a prediction of the motion speed and the magnitude of the motion. These parameters can be determined in accordance with any of the methods described above; these parameters are representative of an expected user response to a sound.

In some cases the motion prediction unit 610 may be operable to determine a predicted motion that corresponds to a motion of the user (and therefore the HMD) to look towards a sound source in the captured audio. Alternatively, the motion prediction unit 610 may be operable to determine a predicted motion that corresponds to a motion of the user to look away from a sound source, or towards a different location (such as a particular object) to that of the apparent source of the sound. Of course, in many cases it may be considered that the motion prediction unit 610 is configured to determine the predicted motion direction based upon parameters relating to the sound, sound source, and/or user of the HMD.

The content obtaining unit 620 is operable to obtain content for display in dependence upon the predicted motion of the HMD. This content may be obtained from any suitable source of content—examples include removable storage media (such as discs), hard drives, and/or remote storage (such as network-attached storage, a server, or another processing device). This content may include any content that is used to generate an image for display to a user; this may include pre-generated image content, virtual assets, meshes, textures, point clouds, or any other content. This obtaining of content can be considered to be a pre-loading of assets or the like so as to make them available in advance of an associated rendering process; this can thereby reduce the latency associated with the rendering, as less content would need to be obtained at the time of rendering.

The obtained content may be obtained in dependence upon an expected image to be displayed to a user upon completion of the predicted motion. The obtained content may be limited to content associated with images that would be displayed to the user with the predicted motion having been completed, or it may comprise content associated with viewpoints adjacent to that which would be displayed—this can be advantageous in the case in which a user moves their head by more or less than a predicted amount, for example, by effectively introducing a tolerance on the prediction. This tolerance can be determined in dependence upon a confidence value associated with a prediction, such that a more confident prediction is associated with a lower tolerance (that is, the obtained content is limited more closely to the image that would be displayed upon completion of the predicted motion).

In some cases, the content that is obtained may be selected in dependence upon one or more properties of the content itself. For instance, in some cases it may be considered advantageous to preferentially obtain content that is larger in file size (as this content may be associated with a greater obtaining latency). Similarly, the size of an object may be considered as may the significance of an object in a scene.

As noted above, the content obtaining unit may be operable to obtain content from a server via a network connection such as the internet. This may be particularly useful in contexts in which one or more assets are stored remotely from the rendering device. This can enable the use of a device with limited storage for rendering while mitigating any latency issues that may arise from the use of such an arrangement.

The content display unit 630 is operable to generate an image for display to a user in dependence upon the obtained content, wherein the display is performed when the user exhibits the predicted motion. While this could be regarded as a dependence upon a user taking a specific action to enable the display of the obtained content, this is not considered to be appropriate. For instance, it is noted that as the predicted motion process can be updated in response to failed predictions it may be considered that the predictions are able to be made sufficiently accurate that the discussed advantages of embodiments of the present disclosure can be realised even if there are instances in which the predicted motion does not occur. In the case that a particular user does not respond to sounds by moving their head (such as if a user is hearing impaired), this is factored into the prediction such that the obtaining of content would not be performed. As such the advantages of the presently claimed arrangement are not dependent upon a user action, as the obtaining of the content is only performed when the user action would occur with a sufficient degree of certainty.

The arrangement of FIG. 6 is an example of a processor (for example, a GPU and/or CPU located in a games console or any other computing device) that is operable to obtain, and optionally display, content for display to a user of an HMD, and in particular is operable to:

capture audio in the environment of the user;
predict motion of the HMD in dependence upon the captured audio;
obtain content for display in dependence upon the predicted motion of the HMD; and
generate an image for display to a user in dependence upon the obtained content.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A system for obtaining content for display to a user of a head-mountable display device, HMD, the system comprising:
one or more audio detection units operable to capture audio in the environment of the user;
a motion prediction unit operable to predict motion of the HMD in dependence upon the captured audio; and
a content obtaining unit operable to obtain content for display in dependence upon the predicted motion of the HMD.

2. A system according to clause 1, wherein the one or more audio detection units comprise one or more microphones, directional microphones, and/or microphone arrays.

3. A system according to any preceding clause, wherein the captured audio comprises one or more sounds emitted by a device that is not associated with the HMD.

4. A system according to clause 1 or 2, wherein the sounds are associated with content displayed on the HMD.

5. A system according to any preceding clause, wherein the motion prediction unit is operable to predict motion in dependence upon one or more characteristics of a sound within the captured audio and/or one or more characteristics of a sound source within the captured audio.

6. A system according to any preceding clause, wherein the motion prediction unit is operable to predict motion in dependence upon one or more characteristics of the user of the HMD.

7. A system according to any preceding clause, wherein the motion prediction unit is operable to determine a magnitude, direction, and/or speed of a predicted motion.

8. A system according to any preceding clause, wherein the predicted motion corresponds to a motion of the user to look towards a sound source in the captured audio.

9. A system according to any preceding clause, wherein the obtained content comprises one or more meshes and/or textures.

10. A system according to any preceding clause, wherein the obtained content is obtained in dependence upon an expected image to be displayed to a user upon completion of the predicted motion.

11. A system according to any preceding clause, comprising a content display unit operable to generate an image for display to a user in dependence upon the obtained content.

12. A system according to any preceding clause, wherein the content obtaining unit is operable to obtain content from a server via a network connection.

13. A method for obtaining content for display to a user of a head-mountable display device, HMD, the method comprising:
capturing audio in the environment of the user;
predicting motion of the HMD in dependence upon the captured audio; and
obtaining content for display in dependence upon the predicted motion of the HMD.

14. Computer software which, when executed by a computer, causes the computer to carry out the method of clause 13.

15. A non-transitory machine-readable storage medium which stores computer software according to clause 14.

The invention claimed is:

1. A system comprising:
one or more audio detection units; and
one or more processors configured to:
capture, using the one or more audio detection units, audio in an environment of a user of a head mountable display device (HMD);
determine a location of an object associated with one or more sounds within the audio, wherein the location of the object is not in a same location as a sound source from which the one or more sounds originate;

predict a motion of the HMD based upon the audio; and
obtain content used for generating an image for display based upon the motion of the HMD, wherein:
the content comprises one or more meshes and/or textures to be used in generating the image; and
the content is obtained based upon at least one of the content being included in a file having a file size that is larger than a file size of a file comprising other content and an object of the content having a larger size than a size of an object in other content.

2. The system of claim 1, wherein the one or more audio detection units comprise one or more microphones, directional microphones, and/or microphone arrays.

3. The system of claim 1, wherein the sound source is not associated with the HMD.

4. The system of claim 1, wherein the one or more sounds are associated with content displayed on the HMD.

5. The system of claim 1, wherein the motion of the HMD is predicted based upon one or more characteristics of a sound within the audio and/or one or more characteristics of the sound source.

6. The system of claim 1, wherein the motion of the HMD is predicted based upon one or more characteristics of the user of the HMD.

7. The system of claim 1, wherein one or more processors are further configured to;
determine a magnitude, direction, and/or speed of a predicted motion.

8. The system of claim 1, wherein the motion of the HMD corresponds to a motion of the user to look towards the sound source.

9. The system of claim 1, wherein the content is obtained based upon an expected image to be displayed to the user upon completion of the motion.

10. The system of claim 1, wherein the one or more processors are further configured to;
generate an image for display to a user in based upon the content.

11. The system of claim 1, wherein one or more processors are further configured to;
obtain content from a server via a network connection.

12. A method for obtaining content for display to a user of a head-mountable display device, HMD, the method comprising:
capturing audio in an environment of the user;
determining a location of an object associated with one or more sounds within the captured audio, where the location of the object is not in a same location as a sound source from which such one or more sounds originate;
predicting motion of the HMD in dependence upon the captured audio; and
obtaining content used for generating an image for display in dependence upon the predicted motion of the HMD, wherein:
the content is obtained prior to initiating the generating of the image, and
the content comprises one or more meshes and/or textures to be used in generating the image and the content is preferentially obtained based upon properties of the content itself, including at least one of preferentially obtaining that content that is of a larger file size than other content, and preferentially obtaining the content that is of a larger object size than other content.

13. A non-transitory machine-readable storage medium which stores computer software which, when executed by a computer, causes the computer to perform a method for obtaining content for display to a user of a head-mountable display device, HMD, the method comprising:
capturing audio in an environment of the user;
determining a location of an object associated with one or more sounds within the captured audio, where the location of the object is not in a same location as a sound source from which such one or more sounds originate;
predicting motion of the HMD in dependence upon the captured audio; and
obtaining content used for generating an image for display in dependence upon the predicted motion of the HMD, wherein:
the content is obtained prior to initiating the generating of the image, and
the content comprises one or more meshes and/or textures to be used in generating the image and the content is preferentially obtained based upon properties of the content itself, including at least one of preferentially obtaining that content that is of a larger file size than other content, and preferentially obtaining the content that is of a larger object size than other content.

* * * * *

UNITED STATES PATENT AND TRADEMARK OFFICE
CERTIFICATE OF CORRECTION

| | | |
|---|---|---|
| PATENT NO. | : 12,321,508 B2 | Page 1 of 1 |
| APPLICATION NO. | : 17/867776 | |
| DATED | : June 3, 2025 | |
| INVENTOR(S) | : Maria Chiara Monti | |

It is certified that error appears in the above-identified patent and that said Letters Patent is hereby corrected as shown below:

In the Claims

On Column 13, Line 27, Claim 7, delete "to;" and add --to:--.

On Column 13, Line 37, Claim 10, delete "to;" and add --to:--.

On Column 13, Line 38, Claim 10, after "user" delete "in".

On Column 13, Line 41, Claim 11, delete "to;" and add --to:--.

Signed and Sealed this
Eighteenth Day of November, 2025

John A. Squires
*Director of the United States Patent and Trademark Office*